(12) United States Patent
Kabalnov et al.

(10) Patent No.: US 8,864,267 B2
(45) Date of Patent: Oct. 21, 2014

(54) LIGHTFASTNESS CONTROL FOR PRINTERS

(71) Applicant: Hewlett-Packard Development Company, L.P., Houston, TX (US)

(72) Inventors: Alexey S. Kabalnov, San Diego, CA (US); Thomas Jeffrey Winter, Washington, DC (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/736,621

(22) Filed: Jan. 8, 2013

(65) Prior Publication Data

US 2014/0192106 A1    Jul. 10, 2014

(51) Int. Cl.
*B41J 2/205* (2006.01)
*B41M 5/50* (2006.01)

(52) U.S. Cl.
CPC ............................ *B41M 5/50* (2013.01)
USPC ................................................ 347/15

(58) Field of Classification Search
CPC ............ B41J 2/04501; B41J 2/04535; B41J 2/04573; B41J 2/04593
USPC .................... 347/43, 6, 15, 84–87
See application file for complete search history.

(56) References Cited

U.S. PATENT DOCUMENTS

| 6,022,659 | A | 2/2000 | Kanbayashi et al. |
| 6,322,188 | B1 | 11/2001 | Sano |
| 6,706,104 | B2 | 3/2004 | Takuhara et al. |
| 7,232,632 | B2 | 6/2007 | Kondou et al. |
| 7,396,109 | B2 | 7/2008 | Courian |
| 2003/0119940 | A1 | 6/2003 | Smith et al. |
| 2005/0088484 | A1* | 4/2005 | Nagashima ............. 347/43 |

FOREIGN PATENT DOCUMENTS

JP          10186779 A    7/1998

OTHER PUBLICATIONS

Wilhelm, et al: "An Overview of the Permanence of Inkjet Prints Compared with Traditional Color Prints"; IS&T's Eleventh International Symposim on Photofinishing Technologies: The Society for Imaging Science and Technology: 2000: pp. 34-39.

* cited by examiner

*Primary Examiner* — Stephen Meier
*Assistant Examiner* — Sharon A Polk

(57) ABSTRACT

A printer includes an ink reservoir that includes yellow ink, cyan ink, and magenta ink. The printer includes an ink dispenser that employs a yellow distribution setting to increase the drop volume of yellow ink droplets and lower the drop frequency of the yellow ink droplets on the media with respect to the cyan ink droplets and/or magenta ink droplets to control the lightfastness of the print on the media.

18 Claims, 5 Drawing Sheets

LIGHTFASTNESS CONTROL FOR PRINTERS

BACKGROUND

Lightfastness is a term used to describe the permanence of printed images and how well they stand up to exposure to light. Sunlight and artificial lighting can cause a reaction within ink pigments and can cause the color to fade or change over time of exposure. In printing, when an ink is referred to as lightfast, it means the manufacturer states that it has a strong light-fade resistance. There are many techniques to improve the lightfastness of ink pigments. For example, by changing ink chemistry and by utilizing protective overcoats including ultraviolet filters, as well as by using lightfastness additives in the ink, one can improve light-fade resistance. All these approaches have tradeoffs in color strength however, and require additional cost to increase fading resistance.

DETAILED DESCRIPTION

This disclosure relates to lightfastness control for printers. For example, lightfastness control can be provided by controlling the drop volume (e.g., amount of ink dispersed) and drop frequency (e.g., number of ink drops per unit area) of yellow ink droplets in a printed image versus the drop volume and drop frequency of droplets for other colors such as cyan and magenta. Color distribution settings can be set which guide the amount and distribution of yellow droplets on a media. By controlling the yellow distribution setting for density and distribution of ink droplets on the media, the lightfastness of the image can be improved as the image is exposed to light over time. For example, rather than setting the drop volume and drop frequency the same for all three primary colors of yellow, cyan, and magenta, as conventional, the yellow distribution setting can be adjusted such that the drop volume per ink droplet is increased and the drop frequency of the yellow droplets decreased over a given area with respect to the configured distribution settings of cyan and magenta. By increasing the drop volume of yellow and reducing the drop frequency of yellow droplets versus other color settings in the printing process, lightfastness of the image can be improved.

Figure 1:
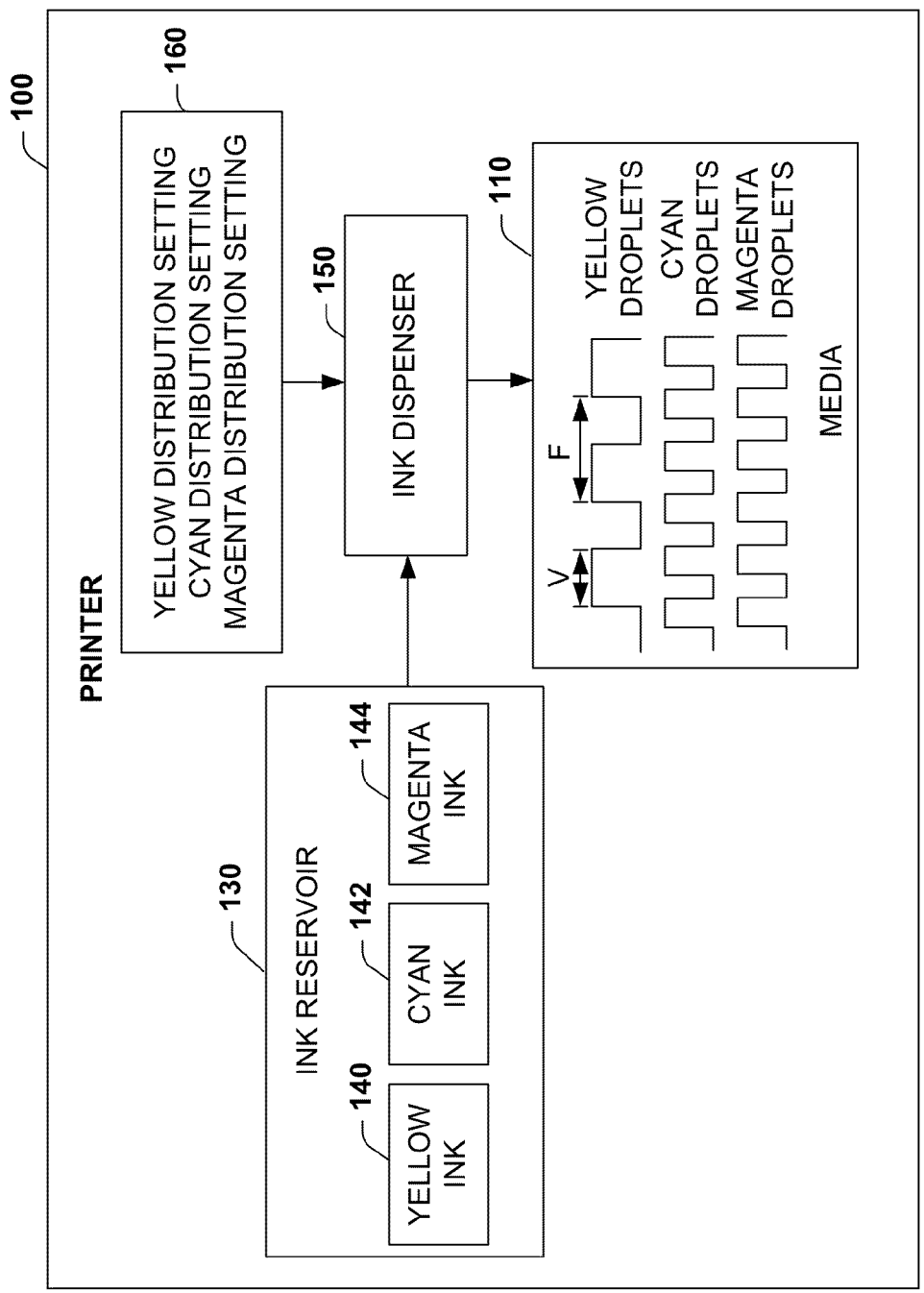
FIG. 1 illustrates an example of a printer to control lightfastness of a print on a media.

FIG. 1 illustrates an example of a printer 100 to control lightfastness of a print on a media 110. The printer 100 includes an ink reservoir 130 that includes yellow ink 140, cyan ink 142, and magenta ink 144. An ink dispenser 150 in the printer 100 employs distribution settings 160 such as a yellow distribution setting, a cyan distribution setting, or a magenta distribution setting, for example, to distribute yellow ink droplets, cyan ink droplets, or magenta ink droplets from the ink reservoir 130 to create a print on the media 110. Drop volume (shown as V) and drop frequency (F) are shown for dispersal of the ink droplets on the media 110, wherein width in the peaks of the distribution pattern represent volume (V) and distance between peaks represents ink droplet frequency (F) on the media 110. The ink dispenser 150 employs the yellow distribution setting from the distribution settings 160 to increase the drop volume V of yellow ink droplets and lower the drop frequency F of the yellow ink droplets on the media 110 with respect to the cyan distribution setting that controls the drop volume and drop frequency of the cyan ink droplets or the magenta distribution setting that controls the drop volume and drop frequency of the magenta ink droplets. By increasing the drop volume of yellow ink droplets and reducing the drop frequency of yellow ink droplets on the media 110 with respect to the drop volume and drop frequency of cyan and magenta ink droplets, lightfastness of the print on the media can be controlled.

Lightfastness of pigments can be affected by the manner in which ink is distributed on the media 110. More specifically, the lightfastness can be improved if the pigment is distributed on the media 110 into thicker (e.g., increased drop volume) and sparser stacks of ink (e.g., reduced drop frequency), compared to more frequent thinner stacks of similar average optical density. Conventionally, ink from the three primary colors was distributed in about equal amounts and across similar ink drop distribution patterns. A possible reason for improved lightfastness control by altering drop volume and drop frequency of yellow is related to the shielding effect of the top pigment layer on the bottom layer. Thus, the lightfastness of pigmented systems is often delimited by the performance of yellow colorants, which typically absorb in the high-quantum energy range and therefore more prone to photolysis which can impact light-fade performance.

As used herein, yellow ink can include a spectrum of colors that can be employed as yellow. In one example, yellow pigment can span the absorbance spectrum from 350 to 500 nm, with the maximum absorbance at 390-420 nm. A suitable pigment could be CI Pigment Yellow 155, for example.

Other examples of yellow can include CI Pigment Yellow 101, Pigment Yellow 109, Pigment Yellow 110, Pigment Yellow 120, Pigment Yellow 128, Pigment Yellow 138, Pigment Yellow 147, Pigment Yellow 151, Pigment Yellow 154, Pigment Yellow 175, Pigment Yellow 180, Pigment Yellow 213, Pigment Yellow 214, Pigment Yellow 215, Pigment Yellow 74, Pigment Yellow 93, Pigment Yellow 95. Alternatively, the following water-soluble yellow dyes can be used: Acid Yellow 23, Acid Yellow 17, Direct Yellow 132, or Y104 and Y1189 dyes, for example.

In but one example, a substantially larger drop volume (e.g., 3×) drop weight for the yellow ink than for the cyan and magenta can be employed to improve light-fade performance. Such example settings and others can improve the light-fade performance of the yellow ink, without compromising the grain appearance of the image. For example, the drop weights can be 4 nanograms (ng) for cyan and magenta and 12 ng for the yellow. In another example, cyan and magenta could be set for 4 ng drop weight, and yellow could be set for 16 ng—a 4 times ratio. A similar approach for variable in drop size can also be utilized for liquid electro photography, by controlling the split between the photoconductor drum and the developer roller for the yellow ink differently from the cyan and magenta ink, thus providing larger yellow drops (e.g., higher volume) than cyan and magenta.

Various control examples can be provided for the printer 100. In one example, the printer 100 can include a controller (not shown) to adjust the yellow distribution setting, the cyan distribution setting, or the magenta distribution setting to control the lightfastness of the print on the media 110. The controller can receive configuration data (e.g., parametric data set by user) to adjust the yellow distribution setting and control the amount of lightfastness. The configuration data can include a drop volume setting and a drop frequency setting for the yellow distribution setting to control the amount of lightfastness. In another example, the configuration data can include an exposure setting which defines an estimated amount of light that the print is exposed to, wherein the exposure setting adjusts the yellow distribution setting to control the amount of lightfastness.

In one specific example, the yellow distribution setting can be set slightly above the cyan and magenta (e.g., about 1.1 times the drop volume of the cyan distribution setting or the magenta distribution setting). In another example, the yellow distribution setting can be set within a range of about two times the drop volume of the cyan distribution setting or the magenta distribution setting up till the drop volume of about ten times the drop volume of the cyan distribution setting or the magenta distribution setting. In addition to control distribution settings, the printer 100 can also include mechanical distribution settings, wherein the yellow distribution setting, the cyan distribution setting, or the magenta distribution setting can be set by a mechanical setting in the printer 100. For example, the mechanical setting can be a nozzle size for the distribution of the yellow ink droplets, the cyan ink droplets, or the magenta ink droplets. In other examples, the printer 100 can be configured for a fixed setting for the drop volumes of yellow, cyan, and magenta, wherein the drop volume for yellow is set at a fixed amount higher than cyan and/or magenta.

In one example for the printer 100, an ink jet can be employed to distribute the yellow ink droplets, the cyan ink droplets, or the magenta ink droplets. As noted previously in another example, the printer 100 can employ an electro photography dispenser for the yellow ink droplets, the cyan ink droplets, or the magenta ink droplets, wherein a split between a photoconductor drum and a developer roller in the dispenser is adjusted to control the yellow distribution setting, the cyan distribution setting, or the magenta distribution setting.

Various configurations for the ink reservoir 130, ink dispenser 150, and distribution settings 160 are possible within the printer 100. In one example, the ink reservoir 130, the ink dispenser 150, and distribution settings 160 are located as separate components within the printer 100. In another example, an apparatus could be provided having a cartridge installable in the printer 100, wherein the cartridge includes yellow ink, cyan ink, and magenta ink for the printer. An ink dispenser could be located in the cartridge that employs a yellow distribution setting, a cyan distribution setting, or a magenta distribution setting, to distribute the yellow ink, cyan ink, or the magenta ink from the cartridge to the printer 100, wherein the ink dispenser employs the yellow distribution setting to increase the drop volume of yellow ink droplets and lower the drop frequency of the yellow ink droplets on the media with respect to the cyan distribution setting that controls the drop volume and drop frequency of the cyan ink droplets or the magenta distribution setting that controls the drop volume and spatial drop frequency of the magenta ink droplets to control the lightfastness of a print on the media. In yet another example, the ink dispenser in the cartridge could provide ink to a nozzle in the printer 100 that distributes ink droplets to create the print on the media 110.

Figure 2:
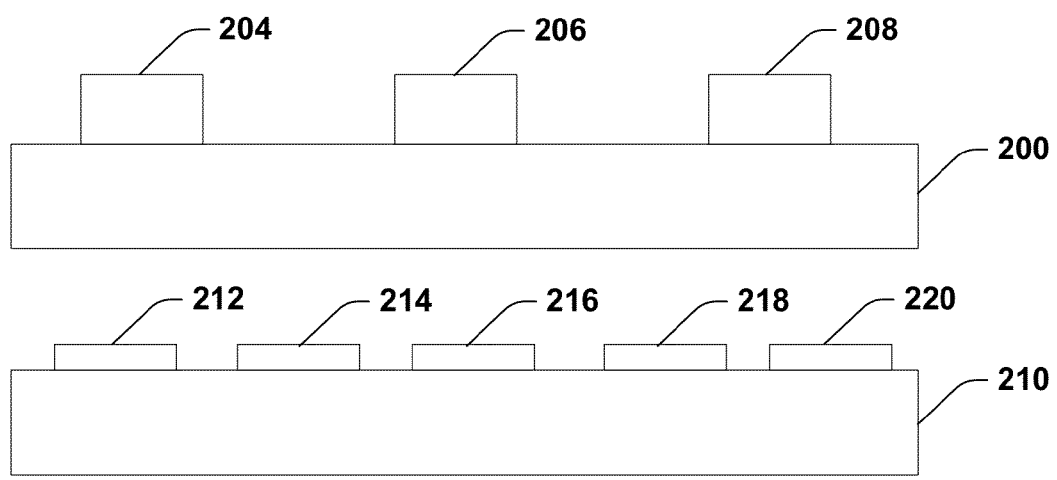
FIG. 2 illustrates an example ink droplet distribution for controlling lightfastness of a print on a media.

FIG. 2 illustrates an example ink droplet distribution for controlling lightfastness of a print on a media. A media 200 is shown having yellow drops 204 though 208. Such yellow drops represent a higher drop volume per drop and reduced frequency of drops per a given area of media than compared to a distribution such as shown at a media 210 having drops 212-220 (e.g., cyan or magenta) that have a lower drop volume per drop and are spaced at an increased drop frequency across the media 210. As noted above, an example ratio of yellow drops to cyan or magenta can be from about two times the drop weight of yellow over the drop weight of cyan or magenta up to about ten times the drop weight for yellow over the drop weight of cyan or magenta. Even if a particular printing was all in a single color such as yellow for example, the configured distribution setting for the yellow distribution would be such that the yellow was distributed at a higher drop volume and reduced drop frequency over the configured distribution setting settings for cyan and/or magenta—even though for a given print example, only one color was employed in the print. Although, rectangular structures are illustrated as examples for the ink droplets 204-208 and 212-220, it is noted that such drops are typically spherical in nature because the image represents the side view.

Figure 3:
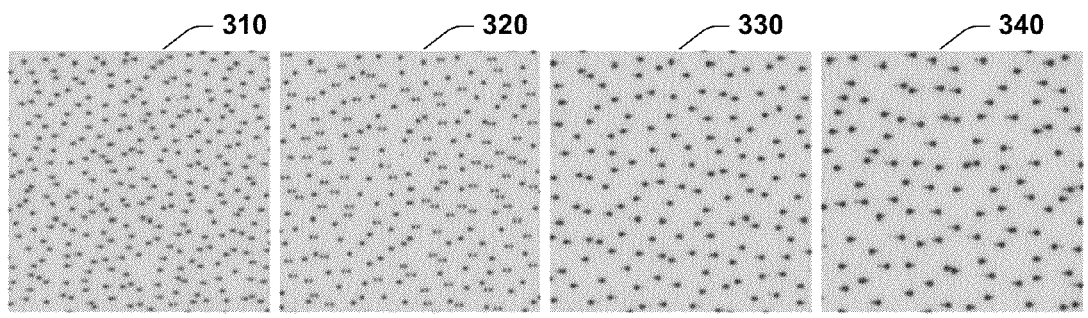
FIG. 3 illustrates example optical micrographs of yellow ink deposited at different drop weights and deposit frequency.

FIG. 3 illustrates example optical micrographs of yellow ink deposited at different drop weights and deposit frequency. FIG. 3 depicts yellow ink droplet patterns/amounts of 4 nanogram (ng) at 310, 6 ng at 320, 9 ng at 330, and 12 ng at 340. Yellow ink was printed on gloss paper using standard 6 ng drops as shown at 320 as well as non-standard 4, 9 and 12 nanogram print heads. A ramp of ten yellow blocks was printed with increasing drop frequency, e.g., larger number of drops deposited per unit area. In each case, the printer was calibrated, so that the difference in the drop weight was compensated by the decreased drop frequency of the yellow dots, to achieve about the same value of blue filter (yellow) optical density at the given Red, Green, Blue (RGB) value. FIG. 3 shows the micrographs of the low frequency areas of the plots, confirming that the drop size on media increased with the size of the drops ejected from the print cartridge and the frequency of the dots was suitably adjusted.

Figure 4:
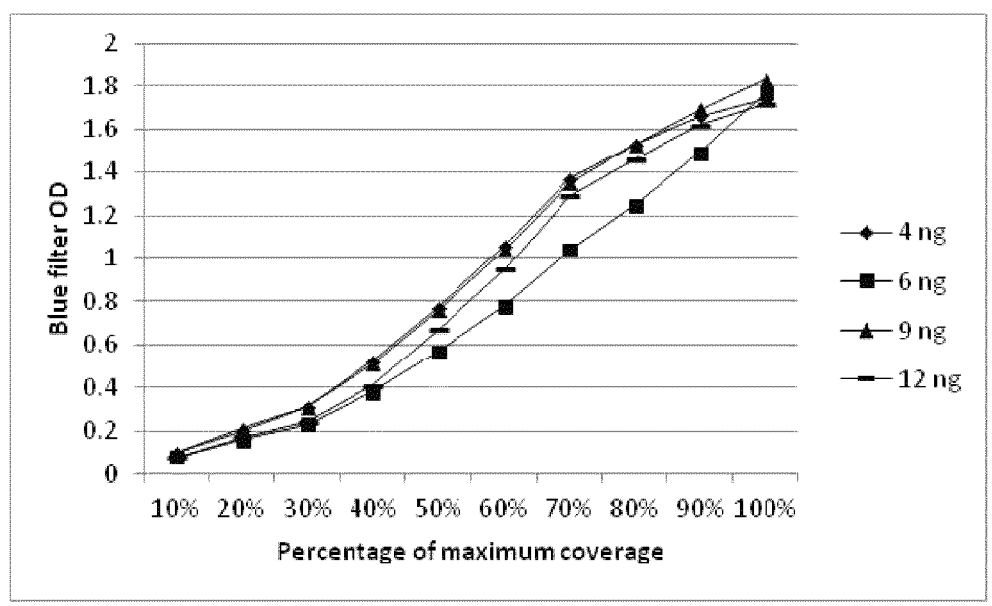
FIG. 4 illustrates yellow optical density of ten print patches versus the percentage of maximum coverage for different drop weights.

FIG. 4 illustrates yellow optical density of ten print patches versus the percentage of maximum coverage for different drop weights. Graphs showing the dependence of the optical density on the drop frequency of the examples of FIG. 3 are shown in FIG. 4. It can be observed that after color calibration, the difference in the optical densities of the yellow patterns can be minimized by mutual compensation of the drop size (e.g., drop volume) and drop frequency effects. Another set of samples can be generated in which the printer also used a transparent gloss optimizer ink—otherwise similar amounts of yellow inks were employed.

Figure 5:
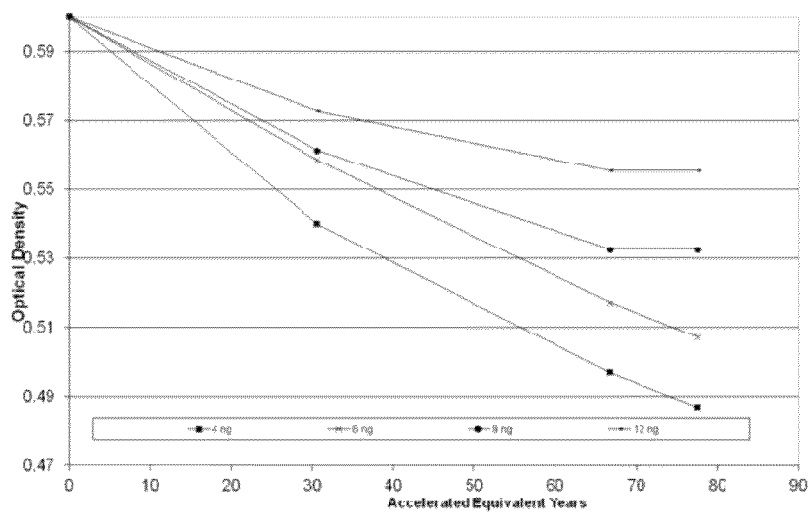
FIG. 5 illustrates kinetics of fade of yellow inks from starting optical density of 0.6 for yellow inks printed from 4, 6, 9 and 12 nanogram print cartridges without the gloss optimizer.
Figure 6:
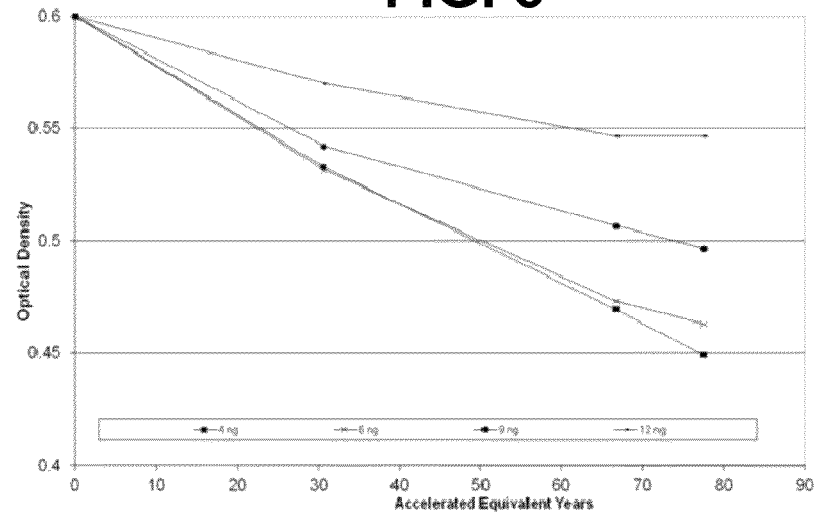
FIG. 6 illustrates kinetics of fade of yellow inks from starting optical density of 0.6 for yellow inks printed from 4, 6, 9 and 12 nanogram print cartridges printed with the gloss optimizer.
Figure 7:
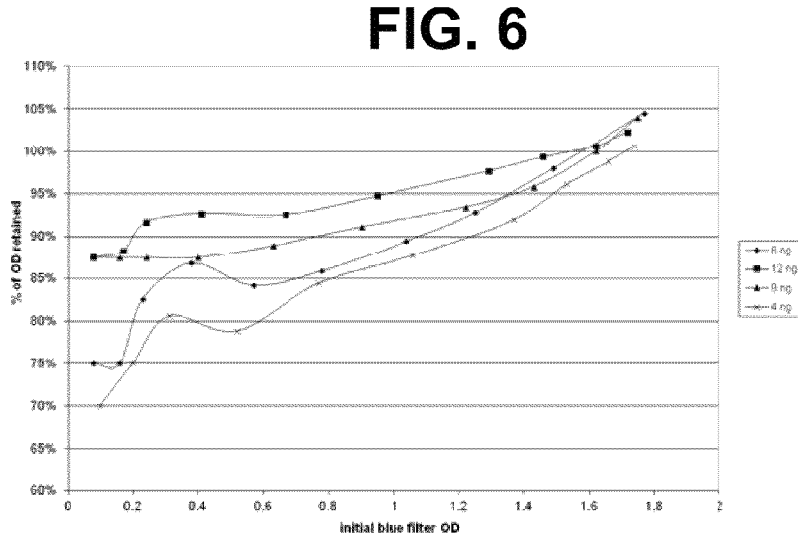
FIG. 7 illustrates percent of optical density retained versus initial optical density for yellow inks printed from 4, 6, 9 and 12 nanogram print cartridges after 80 years of accelerated equivalent years of exposure.

FIGS. 5-7 illustrate differing example fade rates versus different examples of yellow ink drop size. The samples were exposed to cool white fluorescent light under the following conditions: Light intensity=60 kLux, Temperature: 28 C., relative humidity=30%. The decrease in the optical density of the samples was tracked with time. The time of exposure was then converted to 'accelerated fade years' which can be calculated assuming one year of exposure is equivalent to 1971

Klux×hours of accelerated exposure time. FIG. 5 depicts the kinetics of fade of yellow ink from the starting optical density of 0.6 for yellow inks printed from 4, 6, 9 and 12 ng print cartridges. No gloss optimizer was used. The fade kinetics at optical density (OD)=0.6 was calculated by the interpolation of the kinetics of two print patches bracketing OD=0.6. FIG. 6 depicts the kinetics of fade of the yellow inks from the starting optical density of 0.6 for yellow inks printed from 4, 6, 9 and 12 ng print heads. Gloss optimizer was employed for the prints in FIG. 6. The fade kinetics at OD=0.6 was calculated by the interpolation of the kinetics of two print patches bracketing OD=0.6. FIG. 7 depicts the percent of optical density retained versus initial optical density for the yellow inks printed from 4, 6, 9 and 12-ng print cartridges after 80 years of accelerated equivalent years of exposure. The prints for FIG. 7 were printed without gloss optimizer.

From FIG. 5 and FIG. 6, one can observe that the fade rate of the yellow pigment substantially diminishes for the patches formed by the larger drops, and the effect can be observed with and without gloss optimizer. FIG. 7 compares the magnitude of this effect at the different initial optical densities of the print patch. As can be observed, the drop weight effect may diminish at very high initial optical density, where all the drops merge into a continuous film. However, the effect can be significant at intermediate and low optical densities.

Figure 8:
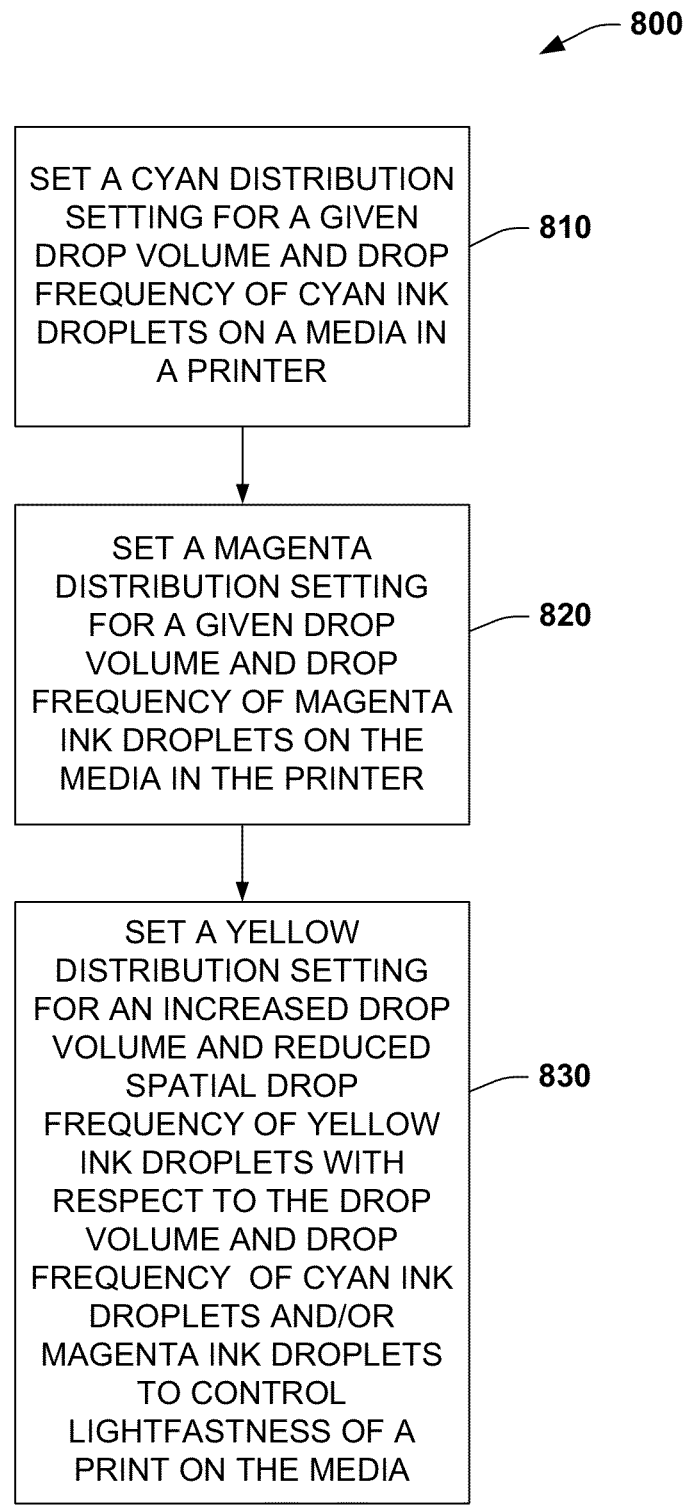
FIG. 8 illustrates an example method to control lightfastness of a print on a media.

In view of the foregoing structural and functional features described above, an example method will be better appreciated with reference to FIG. 8. While, for purposes of simplicity of explanation, the method is shown and described as executing serially, it is to be understood and appreciated that the method is not limited by the illustrated order, as parts of the method could occur in different orders and/or concurrently from that shown and described herein. Such method can be executed by various components configured in an IC or a controller, for example.

FIG. 8 illustrates an example method 800 to control lightfastness of a print on a media. At 810, the method 800 includes setting a cyan distribution setting for a given drop volume and drop frequency of cyan ink droplets on a media in a printer (e.g., via ink dispenser 150 of FIG. 1). At 820, the method 800 includes setting a magenta distribution setting for a given drop volume and drop frequency of magenta ink droplets on the media in the printer (e.g., via ink dispenser 150 of FIG. 1). At 830, the method 800 includes setting a yellow distribution setting for an increased drop volume and reduced drop frequency of yellow ink droplets with respect to the density and distribution of cyan ink droplets and/or magenta ink droplets to control lightfastness of a print on the media (e.g., via ink dispenser 150 of FIG. 1). The method 800 can also include setting the yellow distribution setting within a range of about two times the drop volume of the cyan distribution setting or the magenta distribution setting up till the drop volume of about ten times the density of the cyan distribution setting or the magenta distribution setting. This can include adjusting the yellow distribution setting in an ink jet printer or in a electro photography printer, for example.

What have been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A printer, comprising:
   an ink reservoir that includes yellow ink, cyan ink, and magenta ink; and
   an ink dispenser that employs a yellow distribution setting to increase the drop volume of yellow ink droplets and lower the drop frequency of the yellow ink droplets on the media with respect to the cyan ink droplets and/or magenta ink droplets to control the lightfastness of the print on the media, wherein the drop volume of yellow ink droplets is set within a range of about two times to about ten times the drop volume of the cyan ink droplets or the magenta ink droplets.

2. The printer of claim 1, further comprising a controller to adjust the yellow distribution setting to control the lightfastness of the print on the media.

3. The printer of claim 2, wherein the controller receives configuration data to adjust the yellow distribution setting and control the amount of lightfastness.

4. The printer of claim 3, wherein the configuration data includes a drop volume setting and a drop frequency setting to control the amount of lightfastness.

5. The printer of claim 3, wherein the configuration data includes an exposure setting which defines an estimated amount of light that the print is exposed to, wherein the exposure setting adjusts the yellow distribution setting to control the amount of lightfastness.

6. The printer of claim 1, wherein the yellow distribution setting is set by a mechanical setting in the printer.

7. The printer of claim 6, wherein the mechanical setting is a nozzle size for setting the drop volume of the yellow ink droplets, the cyan ink droplets, or the magenta ink droplets.

8. The printer of claim 1, further comprising an ink jet to distribute the yellow ink droplets, the cyan ink droplets, or the magenta ink droplets.

9. The printer of claim 1, further comprising an electro photography dispenser for the yellow ink droplets, the cyan ink droplets, or the magenta ink droplets, wherein a split between a photoconductor drum and a developer roller in the dispenser is adjusted to control the yellow distribution setting.

10. A method comprising:
    setting a cyan distribution setting for a given drop volume and drop frequency of cyan ink droplets on a media in a printer;
    setting a magenta distribution setting for a given drop volume and drop frequency of magenta ink droplets on the media in the printer; and
    setting a yellow distribution setting for an increased drop volume and reduced drop frequency of yellow ink droplets with respect to the drop volume and drop frequency of cyan ink droplets and/or magenta ink droplets to control lightfastness of a print on the media, wherein the drop volume of yellow ink droplets is set within a range of about two times to about ten times the drop volume of the cyan ink droplets or the magenta ink droplets.

11. The method of claim 10, further comprising adjusting the yellow distribution setting in an ink jet printer or in an electro photography printer.

12. An apparatus comprising:
    a cartridge installable in a printer, wherein the cartridge includes yellow ink, cyan ink, and magenta ink for the printer;

an ink dispenser in the cartridge that employs a yellow distribution setting to increase the drop volume of yellow ink droplets and lower the drop frequency of the yellow ink droplets on the media with respect to the cyan ink droplets and/or magenta ink droplets to control the lightfastness of the print on the media; and an electro photography dispenser for the yellow ink droplets, the cyan ink droplets, or the magenta ink droplets, wherein a split between a photoconductor drum and a developer roller in the electro photography dispenser is adjusted to control the yellow distribution setting.

13. The apparatus of claim 12, wherein the ink dispenser provides ink to a nozzle in the printer that distributes ink droplets to create the print on the media.

14. A printer, comprising:

an ink reservoir that includes yellow ink, cyan ink, and magenta ink;

an ink dispenser that employs a yellow distribution setting to increase the drop volume of yellow ink droplets and lower the drop frequency of the yellow ink droplets on the media with respect to the cyan ink droplets and/or magenta ink droplets to control the lightfastness of the print on the media; and a controller to receive configuration data that includes a drop volume setting and a drop frequency setting associated with the yellow distribution setting, and an exposure setting which defines an estimated amount of light that the print is exposed to, wherein the exposure setting adjusts the yellow distribution setting to control the amount of lightfastness.

15. The printer of claim 14, wherein the yellow distribution setting is set within a range of about two times the drop weight of the cyan ink droplets or the magenta ink droplets up till the drop weight of about ten times the drop weight of the cyan ink droplets or the magenta in droplets.

16. The printer of claim 14, wherein the yellow distribution setting is set by a mechanical setting in the printer.

17. The printer of claim 16, wherein the mechanical setting is a nozzle size for setting the drop volume of the yellow ink droplets, the cyan ink droplets, or the magenta ink droplets.

18. The printer of claim 14, further comprising an electro photography dispenser for the yellow ink droplets, the cyan ink droplets, or the magenta ink droplets, wherein a split between a photoconductor drum and a developer roller in the dispenser is adjusted to control the yellow distribution setting.

* * * * *